United States Patent

Michael et al.

[11] Patent Number: 5,807,009
[45] Date of Patent: Sep. 15, 1998

[54] MECHANICAL COUPLING

[75] Inventors: Robert John Michael, Waterloo; Rene Louis Mathieu Andre Paquet, Lillois, both of Belgium

[73] Assignee: Dow Corning S. A., Seneffe, Belgium

[21] Appl. No.: 354,304

[22] Filed: Dec. 12, 1994

[30]     Foreign Application Priority Data

Dec. 10, 1993  [GB]  United Kingdom .................... 9325343

[51] Int. Cl.$^6$ ........................................... F16D 3/80
[52] U.S. Cl. .......................... 403/31; 403/111; 403/179; 403/203; 403/228
[58] Field of Search ............................. 403/31, 111, 179, 403/203, 225, 226, 227, 228, 291

[56]         References Cited

U.S. PATENT DOCUMENTS

| | | | |
|---|---|---|---|
| 3,363,870 | 1/1968 | Olson | 248/358 |
| 3,843,601 | 10/1974 | Bruner | 260/46.5 |
| 4,240,763 | 12/1980 | Moore | 403/203 |
| 4,670,530 | 6/1987 | Beck | 528/32 |
| 4,722,957 | 2/1988 | Braun et al. | 524/262 |

*Primary Examiner*—Daniel P. Stodola
*Assistant Examiner*—Bruce A. Lev
*Attorney, Agent, or Firm*—Timothy J. Troy

[57]           ABSTRACT

A mechanical coupling comprises an input member, an output member a chamber associated therewith, within the chamber a charge of cured silicone composition in crumb form and a spring biased piston for compressing the charge to an extent sufficient to permit the compressed silicone to convey rotational motion from the input member to the output member.

5 Claims, 1 Drawing Sheet

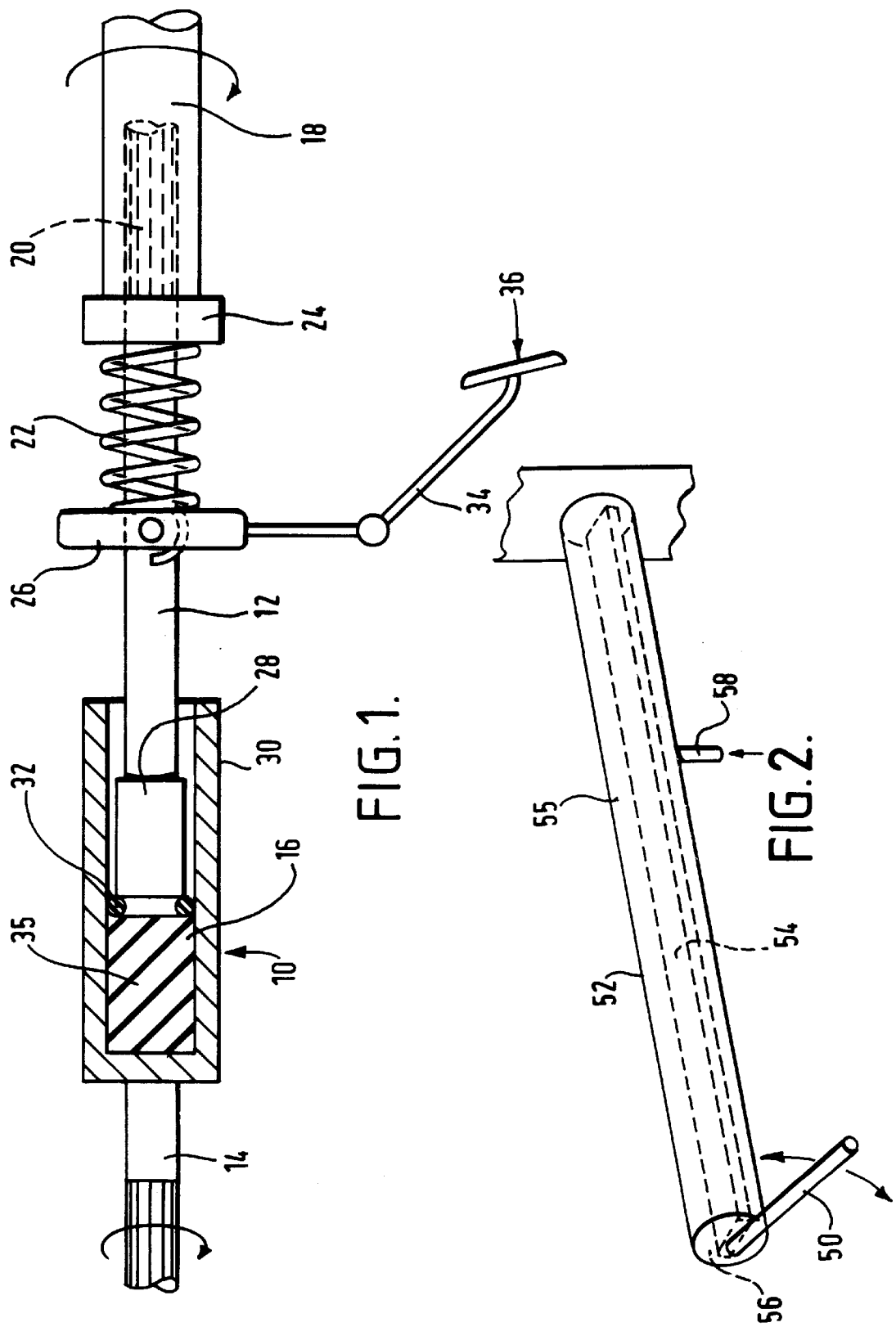

MECHANICAL COUPLING

This invention is concerned with improvements in or relating to mechanical couplings.

Mechanical coupling devices generally comprise mechanical parts arranged to be moved into and out of frictional engagement. Such devices are used in machines to transmit or interrupt movement of parts of the machine as for example slip clutches or brakes on vehicles. Such devices may be actuated by mechanical, pneumatic or hydraulic means.

Silicone fluids have been proposed for use as hydraulic fluids for power brakes. They are known for their stability at extreme temperatures and hydrophobicity. It has also been proposed to employ silicone fluids in torque transmitting devices in which torque is transmitted from one set of plates to another in a slip clutch. One disadvantage of liquids in mechanical coupling devices is that if a leak occurs, it may cause undesirable conditions and the clean up may be difficult. On the other hand, the use of solid materials as hydraulic medium is limited because most solids do not readily move and transfer pressure as conveniently as liquids. Nevertheless it has been proposed to employ silicone materials in the form of cured rubber in crumb form as a "hydraulic" medium. Solid materials in the form of crumb rubber are reported for example in U.S. Pat. Nos. 4,670,530 and 3,843,601 which disclose a silicone crumb in a fine particulate form that readily flows like a liquid, does not agglomerate and can be repeatedly recycled between crumb and clear liquid appearing material.

It is an object of the present invention to provide an improved mechanical coupling device.

The invention provides in one of its aspects a mechanical coupling device comprising an input member, an output member and a chamber associated therewith, said chamber containing a particulate charge and having means for compressing or releasing the charge, wherein the charge consists of a cured silicone rubber composition in crumb form which is free of electromechanical and electrorheological additive wherein the construction and arrangement of the compressing means is such that it is capable of compressing the silicone rubber charge to a condition in which it provides a mechanical coupling between the input member and the output member to transmit rotational movement from one member to the other.

A device according to the invention is intended for use in transmitting torque from one driven member to another. In a device according to the invention, as long as the silicone composition remains in crumb form no torque is transmitted from the input member to the output member. However, when a force is applied to compress the crumb to the extent that the crumbs coalesce, torque may be transmitted from one of the input and output members to the other via the silicone. Upon release of the force, the silicone reverts to its crumb state and torque is no longer transmitted.

In a device according to the invention the silicone composition in crumb form preferably comprises particles having a size in excess of 0.1 micron and less than 1mm, more preferably in the range 25 to 100 micron. Preferred materials have the ability upon compression to become converted from opaque to clear materials; the compressive force required to achieve this change is referred to as the compression point and suitable materials have a compression point of less than about 1035 kilopascals for the first two compressions. Suitable materials are generally comparatively weak rubbers and may be formed by normal techniques for preparing silicone elastomers. Preferred materials may be made by bringing about chemical reaction between a linear or branched alkenyl-containing polyorganosiloxane having at least 0.1% by weight alkenyl groups and made up, for example, of repeating units of diorganosiloxane, monoorganosilsesquioxane units and triorganosiloxy units, a silicon-bonded hydrogen containing polysiloxane having at least 0.5% by weight silicon-bonded hydrogen atoms made up of alkylhydrogensiloxane units and di- or triorganosiloxane units, a noble metal catalyst and a heat stability additive for example a zirconium- or titanium-containing methyl polysiloxane. The alkenyl groups of the siloxane units may be, for example vinyl or allyl. The organo groups of the siloxane units may be hydrocarbon e.g. methyl, ethyl, propyl isopropyl, butyl, octyl or phenyl groups or monovalent halogenated hydrocarbon groups. The noble metal catalyst may be, for example, a rhodium or platinum containing material. Platinum catalysts may take any of the known forms, ranging from platinum as deposited on carriers such as silica gel or powdered charcoal to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on colour of the mixture. Platinum complexes may also be used e.g. those prepared from chloroplatinic acid hexahydrate and divinyl tetramethyldisiloxane. Compositions according to the invention cure very rapidly when the component parts have been mixed together. If it is desired to delay the cure, one may include in the composition one of the known platinum catalyst inhibitors such as a polymethylvinylsiloxane cyclic compound or an acetylenic alcohol. As mentioned, suitable materials are comparatively weak rubbers. They may, for example, have a low elongation at break, for example, of the order of less than about 10%. Being weak and lacking substantial cohesive strength, these materials may be easily crumbled to form the desired particles and yet regain their particulate form after compression through their compression point. Suitable materials include those more fully described in U.S. Pat. No. 4,722,957.

A device according to the invention may find use in numerous situations where transmission of torque is desired to occur intermittently, for example vehicle brakes and clutches and torsion bars.

A device according to the invention comprises an input member and an output member each of which may be, for example, a rotatable bar or shaft coupled in line end to end, or one within the other. For example, the input member may comprise a rotatable shaft driven by an internal combustion engine and the output shaft may be driven to transmit rotation from the input shaft to other mechanism, for example a crown wheel and pinion device through which the road wheels may be driven.

In a mechanical coupling device according to the invention the input member and output member may be provided by any suitable means, for example, a piston and cylinder device which together define the chamber. A device according to the invention comprises means for compressing the charge of cured silicone to an extent sufficient to compress the charge to a condition in which it is capable of providing a mechanical coupling between the input member and the output member. The means may be, for example, pneumatic, hydraulic or mechanical (e.g. spring means) depending on the construction and applicable forces. It is important that the means for compressing the charge of cured silicone be capable of compressing the charge to a condition in which it is capable of providing a mechanical coupling between the input member and the output member i.e. beyond the compression point of the silicone composition. The force required to adequately compress the preferred crumb materials is of the order of about 0.5 to 1 KN/mm$^2$ and may be achieved by any suitable means for example mechanical or hydraulic means. It is desirable to arrange that the compression may be released quickly to cease the transmission of the motion. To this end it is preferred to provide mechanical means within the chamber to assist reversion of the silicone composition to its crumb form for example a disc, rod or helix. We prefer to employ a piston and cylinder device as aforesaid provided with a bar or rod located normal to its stroke and located within the chamber.

A device according to the invention offers the opportunity to provide a low friction device capable of transmitting significant torque and does not rely on materials formulated to respond to electrical stimulus.

In order that the invention may become more clear there now follows a description to be read with the accompanying drawings of two example devices illustrative of the invention.

The first of these is a mechanical coupling device wherein the input member and output member are provided by a piston and cylinder device which together define the chamber and are mounted for movement axially relative to one another to effect compression or release of the charge.

The second is a mechanical coupling device wherein the input member comprises a bar located for rotation within a tube which tube provides the output member and defines the chamber, there being provision for supplying hydraulic fluid to the chamber to compress the charge.

In the drawings:

FIG. 1 is a schematic diagram of a simple clutch incorporating a mechanical coupling according to the invention, and FIG. 2 is a schematic diagram of a variable rate torsion bar incorporating a mechanical coupling according to the invention.

All parts are by weight.

In each of the illustrative devices there was employed a cured silicone composition in crumb form consisting of particles of 50 micron size. The silicone composition was formed by reaction between 97 parts of 1000 cSt dimethylsiloxane having methyl silsesquioxane trimethylsiloxy and dimethylvinysiloxy terminal groups, 1 part of a trimethylsilyl endblocked polymethylhydrogensiloxane, having a viscosity of about 30 mm$^2$/s and a hydrogen content of 1.5 mole %, 0.3 part chloroplatinic acid complexed with vinyldisiloxane, 1.5 parts of the product obtained by heating 74 parts of 20 cSt trimethylsiloxy terminated polydimethysiloxane, 26 parts of zirconium octoate and 0.5 part of methylvinyl cyclic siloxanes The first illustrative device (FIG. 1) is a clutch device intended for use in a motor vehicle. It comprises a mechanical coupling device (10) comprising an input member (12), an output member (14) and a chamber (16) associated therewith. The input member is provided by a shaft connected to a drive shaft (18) of an internal combustion engine by means of a spline (20) which permits movement of the input member axially in the drive shaft (18) whilst transmitting rotational movement of the input member. A spring (22) mounted on the input member between a collar (24) on the drive shaft and an abutment member (26) fixed to the input member (12) urges the input member towards the output member with a force of about 0.5 KN. An end portion of the input member is provided with a piston head (28) which nests in a cylinder (30) secured to an end portion of the output member (14). A seal (32) is provided between the piston head and the internal surface of the cylinder (30). The cylinder and the piston head serve to define the chamber (16) within which is located a charge (35) of the cured silicone composition in crumb form. A linkage (34) connected to the abutment member (26) may be operated by depression of a pedal (36) to compress the spring (22) and move the piston head (28) outwardly of the cylinder (30). Release of the depressed pedal permits the spring (22) to return the piston head under pressure into the cylinder (30). The axial force exerted by the spring (22) is sufficient to compress the charge (35) to a condition in which it is capable of providing a mechanical coupling between the input member and the output member and so transmit torque from the input member to the output member. Release of the pedal pressure permits the charge to revert to its crumb form in readiness for a further cycle.

The second illustrative device (FIG. 2) is a variable rate torsion bar and comprises an input member provided by a shaft (50) and an output member provided by a cylindrical tube (52). Within the tube is mounted a rectangular section bar (54) and the shaft (50) is coupled to one end portion of this bar. The tube is secured to a housing, is sealed at both ends and the chamber (56) so provided therein contains a charge (55) of the cured silicone composition in crumb form. The tube (52) is provided with an inlet (58) through which hydraulic fluid may be pumped into the tube under pressure or removed therefrom. An electrically actuated pressure pump is provided for pumping the fluid into the tube. Ingress of fluid under pressure into the chamber serves to compress the charge (55). Prior to compression of the charge (55) the shaft (50) may be moved about the axis of the tube (52) to rotate the metal bar (54) freely about its axis within the tube. When sufficient pressure has been generated within the tube the charge (55) is in a compressed condition in which it is capable of providing a mechanical coupling between the bar (54) and input member and the tube (52) so that rotation of the bar with respect to the tube is restricted or prevented. Upon release of the pressure the bar again becomes free to rotate within the tube.

That which is claimed is:

1. A mechanical coupling device comprising an input member, an output member and a chamber associated therewith, said chamber containing a particulate charge and having means for compressing or releasing the charge, wherein the charge consists of a cured silicone rubber composition in crumb form which is free of electromechanical and electrorheological additive wherein the construction and arrangement of the compressing means is such that it is capable of compressing the silicone rubber charge to a condition in which it provides a mechanical coupling between the input member and the output member to transmit rotational movement from one member to the other.

2. A mechanical coupling device according to claim 1 wherein the silicone composition in crumb form has a particle size of 25 to 100 micron.

3. A mechanical coupling device according to claim 1 wherein the input member and output member are provided by a piston and cylinder device which together define the chamber and are mounted for movement axially relative to one another to effect compression or release of the charge.

4. A mechanical coupling device according to claim 3 wherein the piston is provided with a member located normal to its stroke which member obtrudes into the chamber.

5. A mechanical coupling device according to claim 1 wherein the input member comprises a bar located for rotation within a tube which tube provides the output member and defines the chamber, there being a means for supplying hydraulic fluid to the chamber to compress the charge.

* * * * *